United States Patent
Jou et al.

(10) Patent No.: US 7,054,284 B2
(45) Date of Patent: *May 30, 2006

(54) METHOD AND APPARATUS FOR SUPERVISING A POTENTIALLY GATED SIGNAL IN A WIRELESS COMMUNICATION SYSTEM

(75) Inventors: Yu-Cheun Jou, San Diego, CA (US); Edward G. Tiedemann, Jr., San Diego, CA (US)

(73) Assignee: QUALCOMM, Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 440 days.

(21) Appl. No.: 09/339,342

(22) Filed: Jun. 23, 1999

(65) Prior Publication Data

US 2002/0080740 A1 Jun. 27, 2002

(51) Int. Cl.
*H04Q 7/00* (2006.01)

(52) U.S. Cl. ..................... 370/329; 370/341
(58) Field of Classification Search ........... 370/229, 370/230, 231, 235, 252, 328, 329, 330, 335, 370/336, 342, 395, 441, 334, 333, 332
See application file for complete search history.

(56) References Cited

U.S. PATENT DOCUMENTS

| 4,901,307 A | | 2/1990 | Gilhousen et al. ............ 370/18 |
| 5,038,347 A | * | 8/1991 | Courtois .................... 370/440 |
| 5,056,109 A | | 10/1991 | Gilhousen et al. ............. 375/1 |
| 5,101,501 A | | 3/1992 | Gilhousen et al. ............ 455/33 |
| 5,103,459 A | | 4/1992 | Gilhousen et al. ............. 375/1 |
| 5,109,390 A | | 4/1992 | Gilhousen et al. ............. 375/1 |
| 5,146,610 A | | 9/1992 | Longshore et al. ......... 455/33.1 |
| 5,271,008 A | * | 12/1993 | Limb ....................... 370/440 |
| 5,282,198 A | * | 1/1994 | Punj ........................ 370/440 |
| 5,506,865 A | | 4/1996 | Weaver, Jr. ................. 375/205 |
| 5,557,609 A | * | 9/1996 | Shobatake et al. .......... 370/395 |
| 5,586,122 A | * | 12/1996 | Suzuki et al. .............. 370/347 |
| 5,678,188 A | * | 10/1997 | Hisamura .................. 455/34.1 |
| 5,764,626 A | * | 6/1998 | VanDervort ................ 370/232 |
| 5,886,992 A | * | 3/1999 | Raatikainen et al. ....... 370/410 |
| 6,169,731 B1 | * | 1/2001 | Stewart et al. ............. 370/332 |

FOREIGN PATENT DOCUMENTS

GB 2313259 11/1997

\* cited by examiner

*Primary Examiner*—Chau Nguyen
*Assistant Examiner*—Soon-Dong Hyun
(74) *Attorney, Agent, or Firm*—Philip R. Wadsworth; Thien T. Nguyen; Sandra L. Godsey

(57) ABSTRACT

The present invention is a novel and improved method and apparatus for supervising a potentially gated channel in a wireless communication system. The first method is an extension of the method used in IS-95 with empty frames simply ignored, but with potentially different thresholds. The mobile station maintains a counter of consecutive bad frames, COUNT1, and a counter of consecutive good frames, COUNT2. COUNT1 and COUNT2 are set to zero at the beginning of a call. For each frame received, the mobile station determines if it is a good frame, a bad frame, or an empty frame. If the received frame is a good frame, COUNT1 is reset to zero and COUNT2 is incremented by 1. If the received frame is a bad frame, COUNT1 is incremented by one and COUNT2 is reset to zero. If the received frame is an empty frame, COUNT1 and COUNT2 are unchanged. If COUNT1 reaches a threshold value, TH1, the mobile station shall disable its transmitter. Thereafter, if COUNT2 reaches a threshold value, TH2, the mobile station shall re-enable its transmitter. The mobile station resets its fade timer to X seconds whenever COUNT2 is greater than or equal to TH3.

24 Claims, 3 Drawing Sheets

METHOD AND APPARATUS FOR SUPERVISING A POTENTIALLY GATED SIGNAL IN A WIRELESS COMMUNICATION SYSTEM

BACKGROUND OF THE INVENTION

1. Field of the Invention

The present invention relates to communications. More particularly, the present invention relates to a novel and improved method and apparatus for supervising the performance of a potentially gated channel.

2. Description of the Related Art

The telecommunications Industry Association developed a standard for code division multiple access (CDMA) communications systems in the Interim Standard IS-95A, entitled "Mobile Station-Base Station Compatibility Standard for Dual-Mode Wideband Spread Spectrum Cellular System"(hereafter IS-95). In IS-95 systems, the mobile station controls the energy of its transmissions by means of a combination of open loop and closed loop power control methods. In open loop power control, a mobile station measures the received energy of the forward link signal from a serving base station and adjusts the energy of its reverse link transmission in accordance with this measurement. In closed loop power control, the serving base station measures the energy of transmissions from the mobile station and sends a series of up/down commands based on this measurement to the mobile station which adjusts its transmissions in response. A power control system that employs the combined benefits of closed loop and open loop power control is described in detail in U.S. Pat. No. 5,056,109, entitled "METHOD AND APPARATUS FOR CONTROLLING TRANSMISSION POWER IN A CDMA CELLULAR MOBILE TELEPHONE SYSTEM", which is assigned to the assignee of the present invention and incorporated by reference herein.

In IS-95, the mobile station is required to monitor the Forward Traffic Channel performance during a call. When the mobile station receives twelve ($N_{2m}$) consecutive bad frames, the mobile station is required to disable its transmitter so that it will not jam the reverse link. Thereafter, if the mobile station receives two ($N_{3m}$) consecutive good frames, it should re-enable its transmitter. The mobile station also maintains a fade timer. The fade timer is first enabled when the mobile station enables its transmitter at the beginning of a call, and it is reset for five ($T_{5m}$) seconds whenever two ($N_{3m}$) consecutive good frames are received on the Forward Traffic Channel. If the fade timer expires, the mobile station disables its transmitter and declares a loss of the Forward Traffic Channel and terminate the call.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission" (hereafter cdma2000). In cdma2000, the equivalents of the Forward Traffic Channel in IS-95 are the Forward Fundamental Channel (F-FCH) and the Forward Dedicated Control Channel (F-DCCH). The data frames transmitted on these channels can be either 20 ms or 5 ms in duration. For F-FCH, a frame (20 or 5 ms) is transmitted in every 20 ms interval aligned to the beginning of the CDMA System Time. For F-DCCH, the transmission can be discontinuous, such that there may not be 25 any data frame transmitted in a 20 ms interval aligned to the CDMA System Time.

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

In a communication system that provides data using a QPSK modulation format, very useful information can be obtained by taking the cross product of the I and Q components of the QPSK signal. By knowing the relative phases of the two components, one can determine roughly the velocity of the mobile station in relation to the base station. A description of a circuit for determining the cross product of the I and Q components in a QPSK modulation communication system is disclosed in U.S. Pat. No. 5,506,865, entitled "PILOT CARRIER DOT PRODUCT CIRCUIT", assigned to the assignee of the present invention, the disclosure of which is incorporated by reference herein.

There has been an increasing demand for wireless communications systems to be able to transmit digital information at high rates. One method for sending high rate digital data from a remote station to a central base station is to allow the remote station to send the data using spread spectrum techniques of CDMA. One method that is proposed is to allow the remote station to transmit its information using a small set of orthogonal channels, this method is described in detail in U.S. Pat. No. 6,396,804, entitled "HIGH DATA RATE CDMA WIRELESS COMMUNICATION SYSTEM", assigned to the assignee of the present invention and incorporated by reference herein.

New methods for supervising the F-DCCH are needed when F-DCCH is in this discontinuous transmission (DTX)

mode because the mobile station must now decide whether a received frame is a good frame, a bad frame, or an empty frame (i.e., no transmission).

SUMMARY OF THE INVENTION

The present invention is a novel and improved method and apparatus for supervising a potentially gated channel in a wireless communication system.

The first method is an extension of the method used in IS-95 with empty frames simply ignored, but with potentially different thresholds. The mobile station maintains a counter of consecutive bad frames, COUNT1, and a counter of consecutive good frames, COUNT2. COUNT1 and COUNT2 are set to zero at the beginning of a call. For each frame received, the mobile station determines if it is a good frame, a bad frame, or an empty frame. If the received frame is a good frame, COUNT1 is reset to zero and COUNT2 is incremented by 1. If the received frame is a bad frame, COUNT1 is incremented by one and COUNT2 is reset to zero. If the received frame is an empty frame, COUNT1 and COUNT2 are unchanged. If COUNT1 reaches a threshold value, TH1, the mobile station disables its transmitter. Thereafter, if COUNT2 reaches a threshold value, TH2, the mobile station re-enables its transmitter. The mobile station resets its fade timer to X seconds whenever COUNT2 is greater than or equal to TH3.

In the second exemplary embodiment, the base station transmits a "supervisory frame" periodically (for example, at the beginning of every N-second interval aligned to the beginning of the CDMA System Time), if there is no data frame to be transmitted on the F-DCCH at that time. The supervisory frame is transmitted at the lowest data rate that has been negotiated between the base station and the mobile station. The mobile station then performs F-DCCH supervision on frames transmitted at such preset times in a way similar to that defined in IS-95, with potentially different values for various thresholds. The mobile station may also include other non-empty frames received for supervision purposes in addition to these periodic frames.

In the third exemplary embodiment, the base station transmits a "supervisory frame" whenever the number of consecutive empty frames exceeds a threshold, or when the number of empty frames (consecutive or not) in a given interval exceeds certain threshold. This ensures that the mobile station has some non-empty frames to perform supervision on every so often.

In the fourth exemplary embodiment, the mobile station transmits a message that requires reply from the base station (for example, the reply can simply be an acknowledgement) when the number of consecutive empty frames detected exceeds a threshold. This ensures that the mobile station will receive a non-empty frame upon which to perform supervision.

In the fifth exemplary embodiment, the mobile station transmits a message that requires reply from the base station (for example, the reply can simply be an acknowledgement) when the number of empty frames detected (consecutive or not) in a given interval exceeds a threshold. This ensures that the mobile station will get a non-empty frame to perform supervision on every so often.

In the sixth exemplary embodiment, the mobile station uses the received pilot strength (Ec/Io) of pilots in the Active Set to perform F-DCCH supervision. If the aggregated Active Set pilot Ec/Io is above a preset threshold, the mobile station considers the data, if sent in that frame, will be received correctly —therefore, a good frame. Otherwise, the mobile station considers the frame is bad. A supervision rule (with the above definition of good frame and bad frame) similar to that specified in IS-95 can then be used, with either the same thresholds or modified ones.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
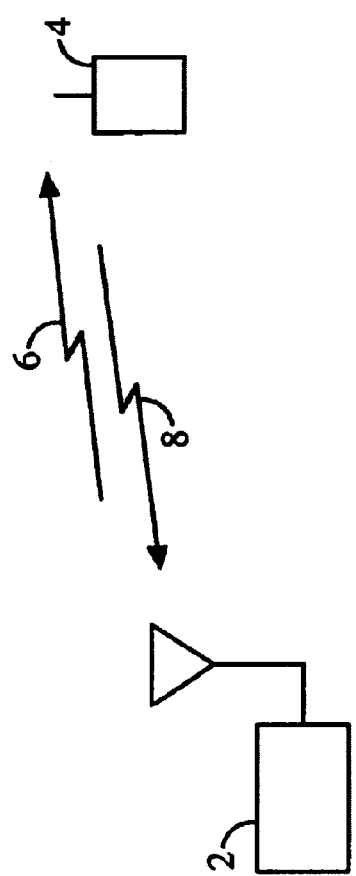
FIG. 1 is a diagram illustrating the elements of a wireless communications system.

In FIG. 1, base station 2 transmits forward link signals 6 to mobile station 4. Mobile station 4 transmits reverse link signals 8 to base station 2. In the exemplary embodiment, forward link signals 6 and reverse link signals 8 are code division multiple access (CDMA) communications signals as contemplated by the Telecommunications Industry Association in the candidate submission to the International Telecommunications Union (ITU) entitled "The cdma2000 ITU-R RTT Candidate Submission" and which has been further refined in the Interim Standard Draft Text entitled "Proposed Ballot Text for cdma2000 Physical Layer".

Figure 2:
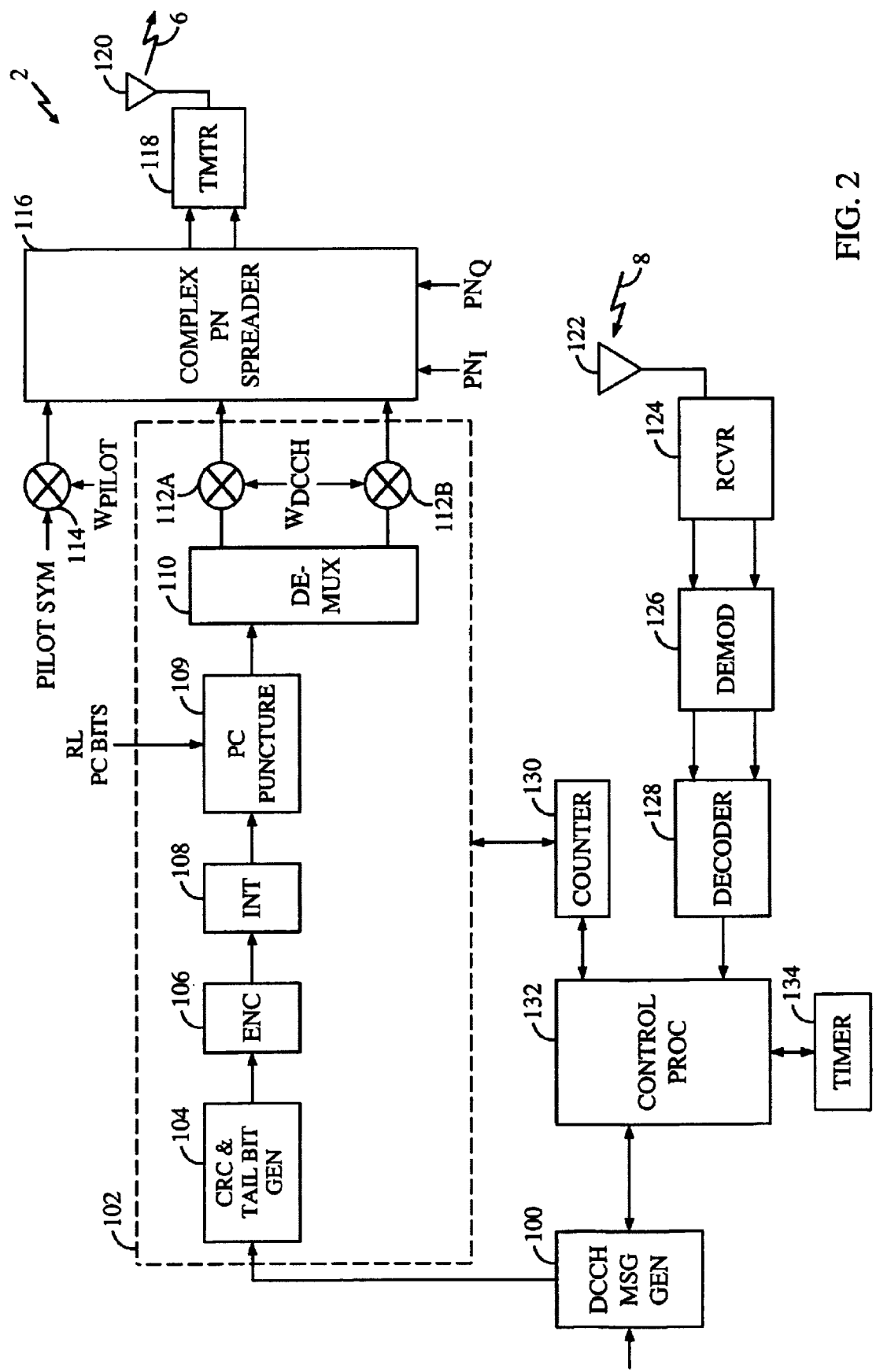
FIG. 2 is a block diagram of the base station of the present invention.

Turning to FIG. 2, the elements necessary for the transmission of the F-DCCH on forward link signal 6 and for reception of reverse link signal 8 is illustrated in greater detail. Messages for transmission on the F-DCCH are generated in F-DCCH message generator (DCCH MSG GEN) 100. These messages may include rate scheduling messages, handoff direction messages and response messages (as will be described further herein). As stated earlier, the F-DCCH is a DTX channel which is transmitted when there is a message to be transmitted and is not transmitted when no message to be transmitted on the F-DCCH is present.

The message is provided to F-DCCH processing element 102. F-DCCH processing element 102 performs the necessary preprocessing and encoding of the F-DCCH message (when present) and channelizes the message for transmission on the F-DCCH of forward link signal 6. The F-DCCH message is provided to CRC and tail bit generator 104. In response CRC and tail bit generator 104 generates a set of cyclic redundancy check (CRC) bits in accordance with the bits in the F-DCCH message and appends the CRC bits to the F-DCCH message. CRC and tail bit generator 104 then appends a series of tail bits to clear the memory of a decoder at the receiver and provides the resulting packet to encoder 106.

In the exemplary embodiment, encoder 106 is a convolutional encoder. The design and implementation of which is well known in the art. It will be understood by one skilled in the art, the present invention is equally applicable to other encoders such as block coders and turbo coders. The encoded symbols are provided to interleaver 108. Interleaver 108 reorders the symbols in a predetermined fashion in order to provide time diversity into the transmission 5 of the F-DCCH message. Errors in wireless communications systems typically occur in bursts. Decoders have significant performance advantages when dealing with errors that do not occur in bursts. The interleaving operation helps to spread the results of a error burst over the packet in order to improve the performance of the decoder at the receiver.

The interleaved symbols are provided to power control puncturing element 109. Puncturing element 109 receives reverse link power control bits and punctures the power control bits into the interleaved symbol stream. The power control bits are transmitted to mobile station 4 and are used to adjust the transmission energy of reverse link signal 8.

The symbols from puncturing element 109 are provided to de-multiplexer 110 which alternatively outputs the symbols onto two different processing paths. The first output of de-multiplexer 110 is provided to spreading element 112a and the next output of de-multiplexer 110 is provided to spreader 112b, and so on. Spreaders 112 spread the de-multiplexed symbols in accordance with an orthogonal spreading function $W_{DCCH}$. Orthogonal spreading is well known in the art and a preferred embodiment of spreaders 112 is disclosed in the aforementioned U.S. Pat. No. 5,103,459. The spread signals are provided to complex PN spreader 116.

In addition to the dedicated control channel, base station 2, in the exemplary embodiment, transmits a pilot channel to allow remote station 4 to coherently demodulate the received F-DCCH. Pilot symbols, typically the all ones sequence, are provided to spreading element 114. The pilot symbols are spread in accordance with orthogonal spreading sequence $W_{pilot}$, which is orthogonal to spreading sequence $W_{DCCH}$.

The spread signals from spreading elements 112 and 114 are provided to complex PN spreader 116. Complex PN spreader 116 spreads the signals from spreaders 112 and 114 in accordance with two pseudonoise (PN) sequences $PN_I$ and $PN_Q$. Complex PN spreading is well known in the art and is described in detail in the cdma2000 candidate submission, the IS-2000 draft specification and the aforementioned copending U.S. patent application Ser. No. 08/856,428. The complex PN spread signal is provided to transmitter (TMTR) 118. Transmitter 118 up-converts, amplifies and filters the spread signals for transmission through antenna 120 as forward link signal 6. In the exemplary embodiment, transmitter 118 modulates the signal in accordance with a QPSK modulation format.

Figure 3:
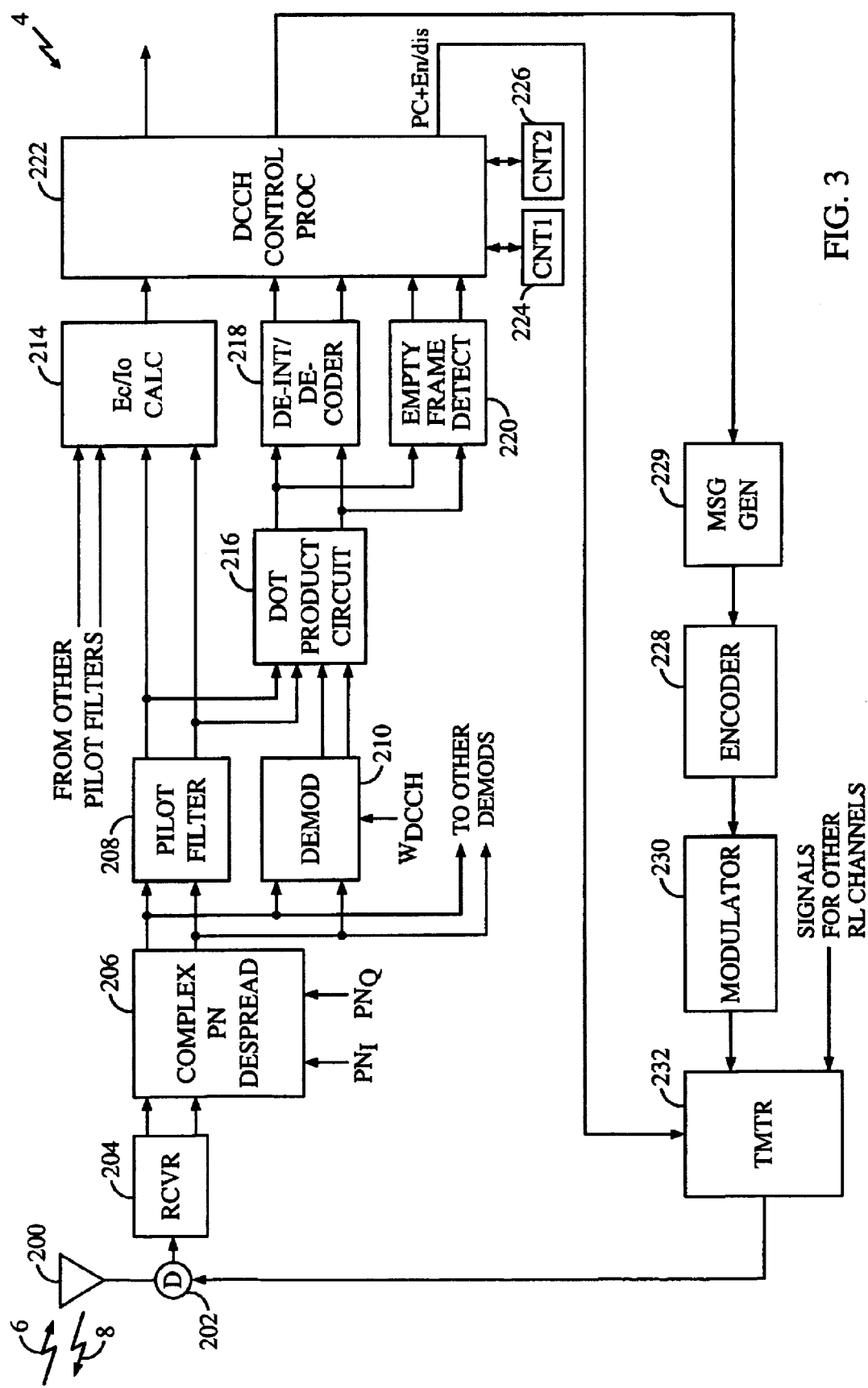
FIG. 3 is a block diagram of the remote station of the present invention.

Turning to FIG. 3, forward link signal 6 is received at antenna 200 and provided through duplexer 202 to receiver (RCVR) 204. Receiver 204 down-converts, amplifies and filters forward link signal 6. In accordance with the exemplary embodiment, receiver 204 demodulates forward link signal 6 in accordance with a QPSK demodulation format and outputs the in-phase and quadrature-phase signals to complex PN despreader 206. Complex PN despreader 206 despreads the received signal in accordance with the two pseudonoise sequences used to spread the signal ($PN_I$ and $PN_Q$).

The complex PN despread signals are provided to pilot filter 208. Pilot filter 208 despreads the signal in accordance with the orthogonal spreading sequence $W_{pilot}$. The despread pilot symbols are provided to Ec/Io calculator 214 and dot product circuit 216.

The complex PN despread signals are also provided to demodulator 210. Demodulator 210 demodulates the PN despread signals in accordance with the orthogonal spreading code $W_{DCCH}$. The despread signals are then provided to dot product circuit 210. Dot product circuit 210 computes the dot product of the F-DCCH and the pilot channel.

Because both the pilot channel and dedicated control channel traverse the same propagation path they will experience the same phase shifts. By computing the dot product of the pilot and DCCH channels the result is a scalar set of magnitudes with the channel induced phase ambiguities removed. A preferred implementation of dot product circuit 216 is described in detail in the aforementioned U.S. Pat. No. 5,506,865.

The resultant demodulated symbols from dot product circuit 216 are provided to de-interleaver/decoder 218 and empty frame detector 220. Deinterleaver/decoder 218 de-interleaves and decodes the F-DCCH message and provides an estimate of the message or a signal indicating the declaration of a bad frame to DCCH control processor 222. There are a number of ways that a bad frame can be detected. A first is to determine whether the cyclic redundancy bits when generated locally at remote station 4 check with the decoded CRC bits. A second is to compute the symbol error rate of the received symbols by comparing the received encoded symbols with a set of locally generated re-encoded symbols based on the decoded bits.

The demodulated symbols from dot product circuit 216 are also provided to empty frame detector 220. In the exemplary embodiment, empty frame detector 220 computes the signal to noise ratio of the demodulated symbols and compares the measured signal to noise ratio to a threshold. If the signal to noise ratio is below the threshold an empty frame is declared. It should be noted that there are other methods of determining an empty frame, any of which may be employed without leaving the scope of the present invention. A method and apparatus for detecting empty frames is disclosed in U.S. Pat. Ser. No. 6,347,080, issued Feb. 12, 2002, entitled "ENERGY BASED COMMUNICATION RATE DETECTION SYSTEM AND METHOD", which is assigned to the assignee of the present invention and incorporated by reference herein.

The data frames that are not empty are provided to DCCH control processor 222, which extracts the punctured power control commands and sends a signal to transmitter 232 adjusting the transmission energy of reverse link signal 8 in response thereto. The loss of this power control command stream results in an inability to control the power of reverse link signal 8 and the potential for jamming the reverse link.

In a first embodiment of the present invention, the DCCH control processor 222 receives an indication from decoder 218 or detector 220 that a frame is either good, bad or empty. Two counters (CNT1) 224 and (CNT2) 226 are initialized to zero at the beginning of a call. If the received frame is a good frame, then counter 224 is reset to zero and counter 226 is incremented by one. If the received frame is declared a bad frame, then counter 224 is incremented and counter 226 is reset to zero. If the frame is declared empty then values of counters 224 and 226 remain unchanged. If the value of counter 224 reaches a threshold TH1 then DCCH control processor 222 sends a signal to transmitter 232 disabling the transmitter (i.e, output power is turned off). Thereafter, if the value of counter 226 reaches a threshold TH2, then DCCH control processor 222 sends a signal to transmitter 232 re-enabling the transmitter.

In the second exemplary embodiment, base station 2 transmits a frame, referred to herein as a supervisory frame, every N-second interval, if there is no data frame to be transmitted on the F-DCCH at that time. In the preferred embodiment, the supervisory frame contains pre-defined bits known to the mobile station and is transmitted at the lowest data rate that has been negotiated between base station 2 and mobile station 4.

Referring to FIG. 2, timer 134 tracks the N-second intervals and at the expiration of the interval sends a signal to control processor 132. Control processor 132 determines whether there is a message for transmission and if not provides a signal to message generator 100 to generate a supervisory frame. The supervisory frame is transmitted on the F-DCCH channel as described with respect to other DCCH messages previously. Mobile station 4 then performs F-DCCH supervision on non-empty frames transmitted at such preset time in a way similar to that defined in IS-95, with potentially different value for various thresholds. Mobile station 4 may also include other non-empty frames received for supervision purpose in addition to these periodic frames.

In the third exemplary embodiment, base station 2 transmits a frame, referred to herein as a supervisory frame, whenever the number of consecutive empty frames exceeds a threshold. In the preferred embodiment, the supervisory frame contains pre-defined bits known to the mobile station and is transmitted at the lowest data rate that has been negotiated between base station 2 and mobile station 4.

Referring to FIG. 2, control processor 132 tracks the number of consecutive empty frames in accordance with signals from message generator 100. When the number of consecutive empty frames exceeds the threshold values, then control processor sends a signal to issue a supervisory frame to message generator 100 to generate the supervisory frame. The supervisory frame is transmitted on the F-DCCH channel as described with respect to other F-DCCH messages. Mobile station 4 then performs F-DCCH supervision on all non-empty frames in a way similar to that defined in IS-95, with potentially different value for various thresholds.

In the fourth exemplary embodiment, mobile station 4 transmits a message that requires reply from base station 2 (for example, the reply can simply be an acknowledgement) when the number of consecutive empty frames detected exceeds a threshold. Referring to FIG. 3, control processor 222 receives an indication as whether a frame is empty from empty frame detector 220. In this embodiment, counter 224 tracks the number of consecutive empty frame and is reset when a bad frame or good frame are detected. When the count of consecutive empty frames exceeds a threshold, control processor 222 sends a signal to message generator (MSG GEN) 229, which in response generates a request message. The request message is encoded in encoder 228, modulated in modulator 230, and up-converted, amplified and filtered onto a predetermined channel of reverse link signal 8. The request message can be any existing message that is already defined in the standard, which does not cause any base station action besides sending an acknowledgement. For example, the Power Measurement Report Message. The request message can also be a special message that causes the base station 2 to transmit a supervisory frame on the F-DCCH.

Turning to FIG. 2, the request message is received on antenna 8 and provided to receiver 124 which down-converts, amplifies and filters reverse link signal 8 and provides the received signal to demodulator 126. Demodulator 126 demodulates the signal and decoder 128 decodes the demodulated symbols providing the request message to control processor 132. In response, control processor 132 determines if a message is queued to be transmitted on the F-DCCH and if not sends a signal requesting that message generator 100 generate a message for transmission on the F-DCCH. In the exemplary embodiment, the message generated by generator 100 is simply an acknowledgement of the receipt of the request message from mobile station 4.

In the fifth exemplary embodiment, mobile station 4 transmits a message that requires a reply from base station 2 when the number of empty frames detected within a predetermined number of received frames exceeds a threshold regardless as to whether the empty frames are consecutive or not. Referring to FIG. 3, control processor 222 receives an indication as to whether a frame is empty from empty frame detector 220. Counter 224 tracks the number of empty frames in a moving accumulator fashion. When the count of empty frames in a predetermined number of received frames exceeds a threshold, control processor 222 sends a signal to message generator (MSG GEN) 229, which in response generates a request message. The request message is encoded in encoder 228, modulated in modulator 230, and up-converted, amplified and filtered onto a predetermined channel of reverse link signal 8.

Turning to FIG. 2, the request message is received on antenna 8 and provided to receiver 124 which down-converts, amplifies and filters reverse link signal 8 and provides the received signal to demodulator 126. Demodulator 126 demodulates the signal and decoder 128 decodes the demodulated symbols providing the request message to control processor 132. In response, control processor 132 determines if a message is queued to be transmitted on the F-DCCH and if not sends a signal requesting that message generator 100 generate a message for transmission on the F-DCCH. In the exemplary embodiment, the message generated by generator 100 is simply an acknowledgement of the receipt of the request message.

In a sixth exemplary embodiment, mobile station 4 uses the received pilot strength (Ec/Io) of pilots in the Active Set to perform F-DCCH supervision. If the aggregated Active Set pilot Ec/Io is above a preset threshold, mobile station 4 considers the data, if sent in that frame, will be received correctly —therefore, a good frame. Otherwise, mobile station 4 considers the frame as bad. A supervision rule with the above definition of good frame and bad frame similar to that specified in IS-95 can then be used, with either the same thresholds or modified ones.

Referring to FIG. 3, the signal to noise ratio (Ec/Io) of the received pilot symbols is computed in Ec/Io calculator 214. The Ec/Io value for the pilot signal of forward link signal 6 is combined with the Ec/Io value of pilots from other base stations in the Active Set of mobile station 4 to provide an aggregate Ec/Io. The Active Set of base stations is the set of base stations currently communicating with mobile station 4. The aggregate pilot Ec/Io is provided to control processor 222 which compares the aggregate Ec/Io to a threshold value. If the aggregate Ec/Io exceeds a threshold a good frame is declared and if the aggregate Ec/Io is less than the threshold a bad frame is declared. This allows mobile station 4 to infer a received frame, if non-empty, is a good frame or a bad frame without decoding the frame. Based on these counts, mobile station 4 will enable or disable transmitter 232 as described previously.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for supervising a channel in a system supporting a discontinuous transmission mode comprising:

determining if a frame is empty; and sending a supervisory frame wherein the supervisory frame contains pre-defined bits known to a mobile station and is transmitted at a lowest data rate that has been negotiated between a base station and a mobile station.

2. A method of supervising a channel in a system supporting a discontinuous transmission mode, comprising:

transmitting a supervisory frame for a discontinuous transmission when a number of consecutive empty frames exceeds a threshold, wherein the supervisory frame is transmitted at a lowest data rate that has been negotiated between a base station and a mobile station.

3. A method of supervising a channel, comprising:

detecting a number of consecutive empty frames on the channel; and transmitting a message when a number of consecutive empty frames exceeds a threshold, the message requiring a supervisory frame from a base station wherein the supervisory frame contains pre-defined bits known to a mobile station and transmitted at a lowest data rate that has been negotiated between the base station and the mobile station.

4. The method of claim 3, wherein the supervisory frame is an acknowledgement.

5. A remote station, comprising:

an empty frame detector that detects when a frame is empty and sends a signal indicating such;

a counter that counts a number of consecutive empty frames;

a control processor coupled to the empty frame detector and the counter, the control processor resets the counter when a bad frame is detected and when a good frame is detected, and when a number of consecutive empty frames exceeds a threshold, the control processor sends a signal indicating such;

a message generator coupled to the control processor, the message generator generating a message requiring a reply from a base station when it receives the signal; and a transmitter for transmitting the message.

6. The remote station of claim 5, further comprising an Ec/Io calculator that computes an aggregated Active Set pilot Ec/Io by adding a pilot signal of a forward link signal with Ec/Io values of pilots from other base stations in an Active Set of a mobile station.

7. A method of supervising a channel in a system supporting a discontinuous transmission mode, comprising:

detecting a condition where there are no data frames to be transmitted on the channel during a specified time period; and transmitting, periodically, a supervisory frame while the condition exists.

8. The method of claim 7 wherein the supervisory frame is periodically transmitted at the beginning of intervals aligned with a system time.

9. The method of claim 7 wherein the supervisory frame is transmitted at a lowest possible data rate negotiated between a mobile station and a base station.

10. A base station, comprising:

a control processor for detecting a condition where there are no data frames to be transmitted on a channel during a specified time period; and a transmitter for periodically transmitting a supervisory frame while the condition exists.

11. The base station of claim 10 wherein the supervisory frame is periodically transmitted at the beginning of intervals aligned with a system time.

12. The base station of claim 10 wherein the supervisory frame is transmitted at a lowest possible data rate negotiated between a mobile station and a base station.

13. An apparatus for supervising a channel in a system supporting a discontinuous transmission mode, comprising:

means for receiving a message from a remote station, the message indicating that a number of consecutive empty frames exceeds a threshold; and means for transmitting a response to the message.

14. A base station for supervising a channel in a system supporting a discontinuous transmission mode, comprising:

a control processor for receiving a message from a remote station, the message indicating that a number of consecutive empty frames exceeds a threshold; and a transmitter for transmitting a response to the message.

15. A method of supervising a channel, comprising:

receiving a message from a remote station, the message indicating that a number of consecutive empty frames exceeds a threshold; and transmitting a response to the message.

16. A method of supervising a channel, comprising:

means for detecting a number of consecutive empty frames on the channel; and means for transmitting a message when a number of consecutive empty frames exceeds a threshold, the message requiring a reply from a base station.

17. A method of supervising a channel in a system supporting a discontinuous transmission mode, comprising:

detecting a number of empty frames received on the channel during a first interval; and transmitting a message when the number of empty frames during the first interval exceeds a threshold, the message requiring a supervisory frame from a base station wherein the supervisory frame contains pre-defined bits known to a mobile station and transmitted at a lowest data rate that has been negotiated between the base station and the mobile station.

18. The method of claim 17, wherein the supervisory frame is an acknowledgement.

19. A remote station, comprising:

a control processor for detecting a number of empty frames received on a channel during a first interval; and a transmitter for transmitting a message when the number of empty frames exceeds a threshold, the message requiring a supervisory frame from a base station wherein the supervisory frame contains pre-defined bits known to a mobile station and transmitted at a lowest data rate that has been negotiated between the base station and the mobile station.

20. An apparatus for supervising a channel in a system supporting a discontinuous transmission mode, comprising:

means for detecting a number of empty frames received on the channel during a first interval; and means for transmitting a message when the number of empty frames exceeds a threshold, the message requiring a supervisory frame from a base station wherein the supervisory frame contains pre-defined bits known to a mobile station and transmitted at a lowest data rate that has been negotiated between the base station and the mobile station.

21. An apparatus for supervising a channel in a system supporting a discontinuous transmission mode, comprising:

means for receiving a message from a remote station, the message indicating a number of empty frames within a first interval exceeds a threshold; and means for transmitting a supervisory frame in response to the message wherein the supervisory frame contains pre-defined bits known to a mobile station and transmitted at a lowest data rate that has been negotiated between the base station and the mobile station.

22. A base station for supervising a channel in a system supporting a discontinuous transmission mode, comprising:

receiver adapted to receive a message from a remote station, the message indicating a number of empty frames within a first interval exceeds a threshold;

control processor for processing the message; and transmitter for transmitting a supervisory frame in response to the message wherein the supervisory frame contains pre-defined bits known to a mobile station and transmitted at a lowest data rate that has been negotiated between the base station and the mobile station.

23. A method for supervising a channel in a system supporting a discontinuous transmission mode, comprising:

receiving a message from a remote station, the message indicating a number of empty frames within a first interval exceeds a threshold; and transmitting a supervisory frame in response to the message wherein the supervisory frame contains pre-defined bits known to a mobile station and transmitted at a lowest data rate that has been negotiated between the base station and the mobile station.

24. A base station, comprising:

a control processor for detecting a number of consecutive empty frames for transmission in a discontinuous transmission mode on a channel; and a transmitter for transmitting a supervisory frame when the number of consecutive empty frames exceeds a threshold wherein the supervisory frame contains pre-defined bits known to a mobile station and transmitted at a lowest data rate that has been negotiated between the base station and the mobile station.

* * * * *